Dec. 15, 1964   H. LUDWIG   3,160,921
PRODUCTION OF PLASTICS MATERIAL FOOTWEAR
Filed Nov. 22, 1961   2 Sheets-Sheet 1

Inventor:

Inventor:

United States Patent Office 3,160,921
Patented Dec. 15, 1964

3,160,921
PRODUCTION OF PLASTICS MATERIAL
FOOTWEAR
Herbert Ludwig, Desmastrasse 112, Uesen, near
Bremen, Germany
Filed Nov. 22, 1961, Ser. No. 155,886
Claims priority, application Germany, Nov. 25, 1960,
D 34,820; Oct. 17, 1961, L 40,235
7 Claims. (Cl. 18—42)

The present invention relates to an injection molding device for producing plastics material footwear, comprising a mold with hingeably mounted mold members—two side parts and a base part forming the sole profile and an injection passage for the plastics material, a core in the form of a last, and an injection device.

The invention also relates to a mold for injection molding a multi-layered more especially two-coloured plastics material sole to an upper, comprising a longitudinally divided frame and displaceable base ram.

It has become necessary to develop injection molding devices so that they may be used for producing, in a simple and rational manner, plastics material footwear in a single injection mold, which footwear is provided with a sole differing in colour and/or material from the uppers.

Such an injection molding device is not, however, suitable for injection molding two-coloured plastics material soles to uppers and it is an object of the present invention to provide a mold which is suitable for such a purpose.

An injection molding machine is known for producing multi-coloured parts of thermoplastic material, in which the injection mold is mounted so as to be rotatable about a central axis and is divided into as many individual molds as colours are used and in which each individual mold has an injection ram for the appropriate colour associated thereto in front of which the individual mold is swung with each working stroke, and in which each injection piston is actuated by a hydraulic working cylinder common to all injection pistons.

A substantial disadvantage of the abovementioned injection molding machine consists in that several molds are necessary for producing one and the same article. The known machine is thereby comparatively complicated and costly and also less suitable for producing footwear.

It is a further object of the present invention to develop known molds, which have been proved useful in the footwear industry, in such a manner that with comparatively slight modification they are already very suitable for injection molding multi-layered, more especially two-coloured plastics material soles to uppers.

The invention is characterised by the feature that an adaptor member is inserted in the base portion for injection molding the upper and corresponds in shape to the body of the sole or a part of the sole and has an injection passage for the plastics material, which passage corresponds to that of the base portion and is removable from the base part during injection molding of the sole to the upper.

In a preferred embodiment of the invention the adaptor is of such a size that a space is left free between it and the last which is approximately the thickness of the upper.

Such an injection molding device makes it possible to produce plastics material footwear in a simple manner in a single mold having a sole which is different in colour in the upper and/or consists of a different plastics material.

The invention is also characterised by two injection passages disposed with respect to the direction of displacement of the base ram one behind the other, for an intermediate sole and an outer sole, the injection passage situated closer to the base ram and used for injection molding the outer sole being closeable by the base ram.

This feature permits a known mold to be modified in a simple manner so that it is now possible to injection mold two-coloured plastics material soles to uppers. The mold need not be opened during injection molding of the layers. No complicated valves for closing the injection passages are required and only one mold is needed.

In one embodiment of the invention the base ram can have a short transition groove for the plastics material of the outer sole to be injected, the groove extending from its pressure surface diagonally downwards to the outside. This embodiment enables multilayered plastics material soles to be produced without the multilayering being visible at the edge of the sole.

The invention will now be described further by way of example, with reference to the accompanying drawings, in which.

Figure 1:
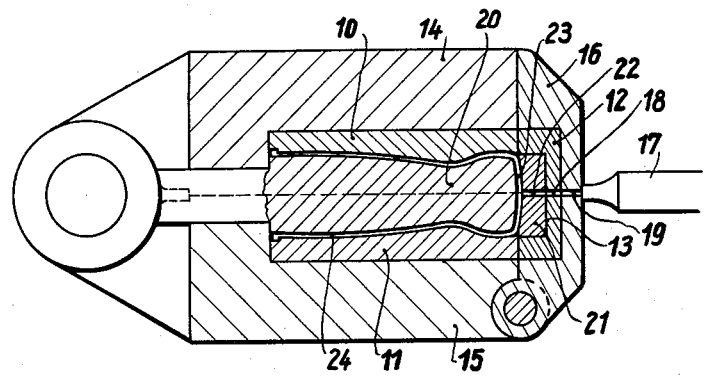
FIG. 1 is a plan view, partly in section of a hinged mold for producing plastics material footwear.
Figure 2:
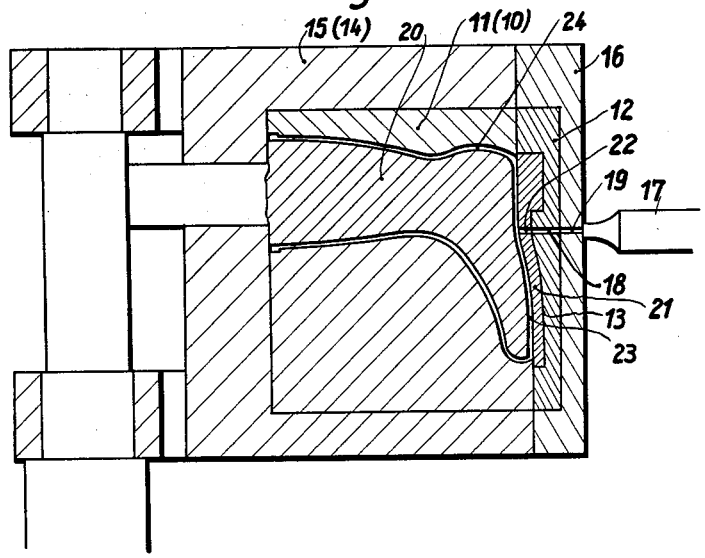
FIG. 2 is a corresponding side view.

The device shown in FIGS. 1 and 2 consists of a mold and an injection device 17. The mold comprises two side portions 10, 11 and a base portion 12 having a sole profile 13 and is also provided with a plastics material injection passage 18. The mold pieces 10 to 12 are inserted so as to be changeable in a mold carrier which consists of parts 14, 15, 16, articulatedly connected with one another. The mold carrier part 16 has an injection passage 19 for plastics material which adjoins the injection passage 18 of the base portion 12. A last 20 is inserted in the mold parts 10, 11 and 12 to act as core.

An adaptor 21, corresponding to the body of the sole, is inserted in the base portion 12 during molding the upper. This adaptor 21 has an injection passage 22 for plastics material which is aligned with the injection passage 18 of the base portion 12. The adaptor 21 advantageously leaves a space 23 free between it and the last 20 corresponding approximately to the thickness of a space 24 for the upper.

With the adaptor 21 inserted in the base portion 12, the upper is molded by injecting a plastics material compound, in the colour and material desired for the upper, into the spaces 23, 24 which are filled completely with this plastics material compound. When the upper has set, the mold is opened and the adaptor 21 removed. After closing the mold again, the sole or a part of the sole, for example the heel, is injection molded to the upper in a colour and/or material differing from that of the upper.

The space 23 between the adaptor 21 and the last 20 need not necessarily reach over the whole area of the last sole. It is also conceivable to provide it extending only strip-like on the outer edge of the last, so that only at this point the sole is joined to the upper.

Figure 3:
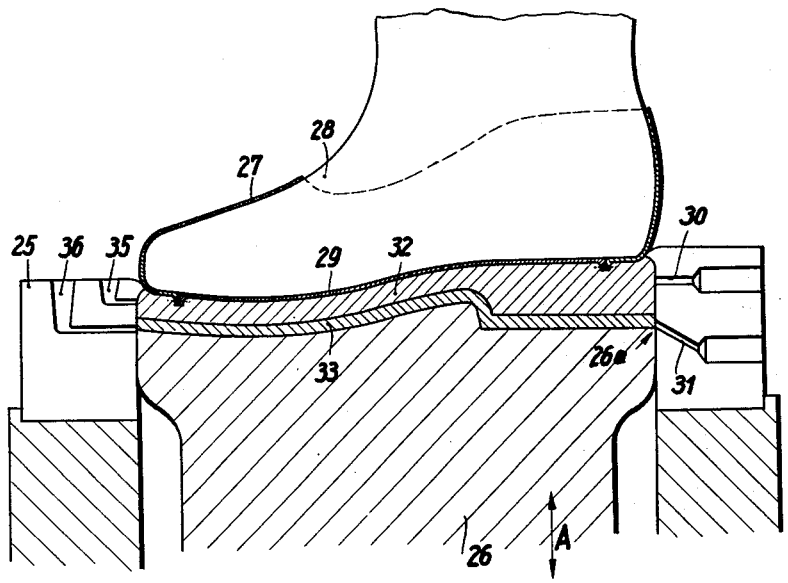
FIG. 3 is a longitudinal section of a mold, with a shoe part therein, for producing a two-coloured or layered sole of plastics material.

The mold shown in FIG. 3 consists of a longitudinally divided frame 25 and a displaceable base ram 26. A last 28, with an upper 27 fitted thereover, is mounted in conventional manner with a sealing effect on the frame 25. The upper 27 is provided with an inner sole 29 stitched thereto. The mold has two injection passages 30, 31 which, with respect of the direction of displacement (double arrow A) of the base ram 26, are arranged one behind the other, for molding an intermediate sole 32 and an outer sole 33, respectively, the injection passage 31 nearest the base ram 26, serving for injection molding the outer sole 33, being adapted to be closed by the base ram 26.

Figure 4:
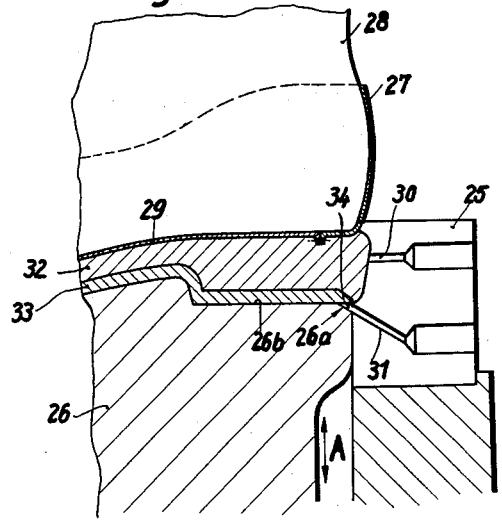
FIG. 4 is a fragmentary longitudinal section of an alternative type of mold, with a shoe part therein, for producing a two-coloured or layered sole of plastics material.

It is evident from FIG. 4 that the base ram 26, at its edge 26a, has a short transition groove 34 for the plastics material to be injected, which groove extends in the direction of the injection passage 31 for the outer sole 33 and downwardly inclined from the pressure surface 26b of the ram.

Ventilating and inspection passages 35, 36 are associated with injection passages 30, 31 at the end of the mold. The injection passages 30, 31 and also the ventilating and control passages 35, 36 are provided in the joint surfaces of the separating plane of the longitudinally divided frame 25 which permits the plastics material plugs formed in the passages to be readily removed on opening the frame 25.

The mold operates in the following manner:

The last 28 with the upper 27 fitted thereover is mounted from above on the closed frame 25. The base ram 26 is upwardly displaced to such an extent that its edge 26a covers the injection passage 31 for the outer sole 33 and seals it tightly. The base ram 26 assumes the upper position and projects by some millimetres into the sole space.

In this position of the base ram 26, plastics material for the intermediate sole 32 is injected into the cavity of the mold through the injection passage 30. As the injection passage 31 is closed by the base ram 26, it is not possible for any material for the intermediate sole 32 to penetrate this injection passage 31 and to set there.

The injection procedure for the intermediate sole 32 is continued until plastics material shows up at the ventilating and control passage 35. The plastics material for the intermediate sole 32, influenced by the heat of the heated mold is now substantially set, so that it has at least because so solidified that the base ram 26 becomes detached therefrom and can be slid downwards into the lower position. In this position the ram 26 exposes the injection passage 31 for the outer sole 33. Moreover a cavity is formed between the intermediate sole 32 and ram itself, for the material for the outer sole 33 to be injected through the passage 31. This material is also injected until plastics material appears at the ventilating and control passage 36. Then the setting of the outer sole 33 takes place mutually with the complete setting of the intermediate sole 32.

By means of the mold shown in FIG. 3 it is possible to produce a two-layered preferably two-coloured sole, the two layers of which are clearly defined at the edge of the sole.

By means of the mold shown in FIG. 4, a sole may be produced which is also two-coloured, wherein however, the two colours or layers of the sole are not visible at the edge. The outer sole 33 is disposed so as to be embedded in the intermediate sole 32, i.e. it is overlapped thereby at the edge. The small raised portion formed in this mold at the transition groove 34 can be readily subsequently removed.

A substantial advantage of the mold described consists in that with one and the same mold, without additional mold parts, it is possible to injection mold multilayered more especially multi-coloured soles; this results in a reduction of costs for the mold.

Moreover the footwear production method may be carried out at comparatively high speed. It is not absolutely necessary for two-coloured soles to be injection molded with the mold described. What is important is that multi-layered soles can be injection molded. This is also of interest inasmuch as for the outer sole it is necessary to use good and abrasion resistant and hence expensive material, whilst for the intermediate sole it is possible to use lower quality, i.e. cheaper material. Moreover it is esay in such a mold to produce an outer sole of any thickness by adjusting the base ram. In this way it is possible to keep the outer sole relatively thin which uses less of the good quality and costly material, which in turn constitutes a further reduction of costs. It is also readily possible for the intermediate sole to be made of soft material and the outer sole of hard material.

In the case of slippers in which hitherto a prefabricated outer sole was inserted in the mold, this may be completely omitted, because the outer sole is injection molded directly thereto. It is cheaper to injection mold a sole than to purchase outer sole material, punch it out and to insert it in the mold. In this way the mold saves material and wages.

I claim:

1. An injection molding device for producing footwear formed at least in part from different plastic materials comprising, in combination, mold means forming together a cavity for molding therein at least the sole of the footwear, said cavity having an open end and a peripheral surface substantially equal to that of the peripheral outline of the sole to be molded;

last means mounted opposite said open end for receiving the upper of the footwear and for closing with the upper thereon said open end, said last means having an end surface facing said cavity;

a single core means insertable in and withdrawable from said cavity and partly filling the same when inserted therein, said core means having an end face spaced from and facing said end surface of said last means and defining with the latter a free space within said cavity;

and injection means for injecting one plastic material in said free space formed in said cavity while the same is partly filled by said core means so that said one plastic material is at least in part supported by said last means and another plastic material into said cavity after said core means is withdrawn therefrom and while said last means remains in place to support said one plastic material during injection of said other plastic material.

2. An injection molding device for producing footwear formed from different plastic materials comprising, in combination, mold means forming together an elongated cavity having a first portion with an inner surface defining substantially the outer surface of the upper to be molded and a second portion of an inner surface defining substantially the outer surface of the sole to be molded;

last means in said first portion and having an outer peripheral surface spaced from said inner surface of said first portion and an end surface facing said second portion of said cavity;

a single core means insertable in and withdrawable from said second portion of said cavity and substantially filling the same when inserted therein, said core means having an end face spaced from and facing said end surface of said last means and defining with the latter a free space within said cavity communicating with a free space formed between the inner surface of said first portion of said cavity and said outer surface of said last means;

and injection means for injecting one plastic material into said communicating free spaces while said core means is inserted into said second portion of said cavity so that said one plastic material is at least in part supported by said last means and another plastic material into said second portion of said cavity after said core means is withdrawn therefrom and while said last means remains in place to support said one plastic material during injection of said other plastic material.

3. An injection molding device as set forth in claim 2 in which said mold means includes a member hingedly connected to the remainder of said mold means and in which said second portion of said cavity is formed in said member.

4. An injection molding device for producing footwear formed at least in part from different plastic materials comprising, in combination, mold means forming a cavity for molding the sole of the footwear, said cavity having a peripheral surface substantially equal to that of the sole to be molded therein and being open at opposite ends thereof;

last means mounted opposite one of said open ends for receiving the upper of the footwear and for closing with the upper thereon said open end, said last means having an end surface facing said cavity;

a single core means extending into said mold means for closing the other of said opposite ends of said cavity, said core means having an end face spaced from and facing said end surface of said last means and being movable toward and away from the same between a first position extending into said cavity and in which said end face thereof is spaced from said end surface of said last means a distance smaller than the desired thickness of the sole to be molded and a second position in which said end face is spaced from said end surface a distance equal to the desired thickness of the sole;

and injection means including a pair of injection passages having inner ends communicating with said mold cavity and being spaced from each other in direction of movement of said core means so that the inner end of one of said passages is closed when said core means is in said first position.

5. An injection molding device as set forth in claim 4 in which said core means has at a portion thereof movable into said cavity a peripheral outline and a cross section transverse to said direction of movement substantially identical to that of said cavity.

6. An injection molding device as set forth in claim 4 in which said core means has at a portion thereof movable into said cavity a peripheral outline geometrically similar to that of said peripheral surface of said cavity and a cross section transverse to said direction of movement which is smaller than that of said peripheral surface.

7. An injection molding device for producing footwear formed at least in part from different plastic materials comprising, in combination, mold means forming together an elongated cavity having a first portion with an inner surface defining substantially the outer surface of the upper to be molded and a second portion of an inner surface defining substantially the outer surface of the sole to be molded, said mold means including a member hingedly connected to the remainder of said mold means and said second portion of said cavity being formed in said member;

last means in said first portion and having an outer peripheral surface spaced from said inner surface of said first portion and an end surface facing said second portion of said cavity;

core means insertable in and withdrawable from said second portion of said cavity and substantially filling the same when inserted therein, said core means having an end face spaced from and facing said end surface of said last means and defining with the latter a free space within said cavity communicating with the free space formed between the inner surface of said first portion of said cavity and said outer surface of said last means;

and injection means for injecting one plastic material into said communicating free spaces while said core means is inserted into said second portion of said cavity and an other plastic material into said second portion of said cavity after said core means is withdrawn therefrom, said injection means including an injection passage formed in said hinged member and having an inner end communicating with said second portion of said mold cavity and a passage through said core means aligned with said injection passage when said core means is inserted into said second portion of said cavity and communicating at an inner end thereof with said free spaces.

References Cited in the file of this patent

UNITED STATES PATENTS

| | | |
|---|---|---|
| 2,114,708 | Gash | Apr. 19, 1938 |
| 2,226,408 | Nast | Dec. 24, 1940 |
| 2,279,208 | Shaw | Apr. 7, 1942 |
| 2,333,059 | Tucker | Oct. 26, 1943 |
| 2,470,089 | Booth | May 17, 1949 |
| 2,765,555 | Gits et al. | Oct. 9, 1956 |